(12) United States Patent
Reuter et al.

(10) Patent No.: US 6,425,610 B1
(45) Date of Patent: Jul. 30, 2002

(54) CONTROL CABINET WITH A CABINET BODY, AN INNER DOOR AND A CLOSING DOOR

(75) Inventors: Wolfgang Reuter, Burbach; Martina Köhler, Herborn; Paul Root, Bad Endbach, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/601,899

(22) PCT Filed: Dec. 23, 1998

(86) PCT No.: PCT/EP98/08434

§ 371 (c)(1), (2), (4) Date: Oct. 5, 2000

(87) PCT Pub. No.: WO99/41478

PCT Pub. Date: Aug. 19, 1999

(30) Foreign Application Priority Data

Feb. 13, 1998 (DE) .......................................... 198 06 064

(51) Int. Cl.[7] ................................................ E05E 3/04
(52) U.S. Cl. .............................. 292/202; 292/DIG. 21; 312/265.1
(58) Field of Search ........................ 292/200, DIG. 19, 292/DIG. 12, DIG. 21, DIG. 30, DIG. 41, DIG. 68, 213, 217, 202, 203, 204; 312/217, 265.1–265.4

(56) References Cited

U.S. PATENT DOCUMENTS 4,678,214 A * 7/1987 Cohn et al. .................. 292/213

FOREIGN PATENT DOCUMENTS

| DE | 40 04 838 | 2/1991 |
| DE | 37 10 563 | 7/1992 |
| DE | 94 19 852.7 | 3/1995 |
| EP | 746 072 | 12/1996 |

* cited by examiner

Primary Examiner—Anne Marie Boehler
(74) Attorney, Agent, or Firm—Pauley Petersen Kinne & Erickson

(57) ABSTRACT

A control cabinet with a cabinet body, whose open front side can be successively closed by an inner door and a closing door presenting a closing device. The inner door can be fixed against the cabinet body at the top and at the bottom by means of a two-armed locking lever and the closing door can be fixed against the cabinet body by means of a locking bar. The closing door partly overlaps the inner door in the closing area. With mirror-symmetrical locking levers, no elements of the locking levers protrude over the free edge of the inner door in any position of the locking levers and the locking levers are easily operated.

14 Claims, 4 Drawing Sheets

CONTROL CABINET WITH A CABINET BODY, AN INNER DOOR AND A CLOSING DOOR

BACKGROUND OF THE INVENTION

1. Field of the Invention

This invention relates to a switchgear cabinet with a cabinet body, with an open front that can be closed sequentially by a counter cabinet door and a lockable cabinet door with a lock device, wherein the counter cabinet door can be secured on the cabinet body at the top and the bottom using a two-armed locking lever, and the lockable cabinet door can be secured on the cabinet body with a rod closure, wherein the lockable cabinet door partially overlaps the counter cabinet door in the locking area.

2. Description of Related Art

When closing the front of switchgear cabinets of this type, first the counter cabinet door is secured on the cabinet body by means of the locking levers, and is then completely locked with the lockable cabinet door. During opening, first the lockable cabinet door is opened and then the counter cabinet door is unlocked. Depending on the design of the locking levers, these project past the free vertical edge of the counter cabinet door with the locking arms or the actuating arms, which represents a danger point. Moreover, often the actuating arms are difficult to grasp, and locking or unlocking of the counter cabinet door can be performed only with difficulty.

SUMMARY OF THE INVENTION

It is one object of this invention to avoid the danger points represented by the locking levers of a switchgear cabinet of the type previously mentioned, and to make the locking and unlocking process of the counter cabinet door easier.

In accordance with this invention, this object is attained because the counter cabinet door is triple beveled in the locking area and forms a groove-like receiver open toward the outside, and the locking levers are made laterally reversed and are rotatably seated and spring-mounted on the inside of the beveled section of the receiver facing the cabinet interior which is aligned parallel in relation to the plane of the counter cabinet door. Buffer elements are attached, which are open toward the outside and project in a U-shape at the top and the bottom in the locking area, into which the beveled sections of the counter cabinet door can be inserted. In a closing position the locking levers extend with their closing arms behind the buffer elements and are limited in their locking motion by buffers in such a way that their actuating arms do no come into the area of mounting rails attached to the inside of the counter cabinet door. In an opening position the closing arms of the locking levers are turned out of the area of the buffer elements, and the actuating arms are limited in their unlocking movement by buffers so that they do not project from the beveled end section of the receiver extending vertically with respect to the counter cabinet door.

With this design it is assuredly prevented that, both in the opening position of the locking levers and in the closing position of the locking levers, no parts of these can project from the free vertical edge of the counter cabinet door. Because of the displacement of the locking levers in the direction toward the cabinet interior, the counter cabinet door itself does not hinder the grasping of the actuating arms of the locking levers, and their actuation is thus considerably eased. The counter cabinet door is pulled tightly against the cabinet body by the resilience of its seating. The buffer elements are attached to the cabinet body so that in the closing position of the counter cabinet door they receive the bevels of the receiver and therefore define its closing position.

So that the locking levers extend resiliently behind the buffer elements and in this way dependably secure the counter cabinet door on the cabinet body, in accordance with one embodiment the closing arms of the locking levers end in locking projections, which are displaced toward the cabinet interior by the amount of the wall thickness of the U-shaped buffer elements with respect to the inside of the beveled section of the receiver extending parallel with the counter cabinet door.

For the use of uniform buffer bodies for the lower and the upper locking lever of the counter cabinet door, the two buffer elements are identically embodied and have two buffers on the outside facing the cabinet interior, of which the buffer, respectively facing the mounting rail, works together with the associated locking lever.

In one embodiment for attaching the buffer elements to the cabinet body the open front of the cabinet body is bordered by frame legs of a rack, and the U-shaped buffer elements have fastening legs, by means of which they are fastened on the facing profiled sides of the horizontally extending frame legs. To ease alignment and positioning of the buffer, fastening system rows with uniformly spaced bores and rectangular holes are cut into the profiled sides of the frame legs. The fastening legs have positioning projections which can be inserted into the openings of the fastening system rows, and fastening bores which can be aligned openings of the fastening systems rows.

Grasping and manipulating the actuating arms is made easier in accordance with one embodiment because the actuating arms are displaced via transition sections toward the cabinet interior in relation to the inside of the beveled section of the receiver, extending parallel with the counter cabinet door. The opening position of the locking levers is defined because the actuating arms have beveled buffer flanges in the area of their displaced ends.

In another embodiment a beveled edge of the lockable cabinet door can be inserted into the receiver of the counter cabinet door. The rod closure attached to the inside of the lockable cabinet door is received in the receiver of the counter cabinet door. The rod closure of the lockable cabinet door is covered toward the cabinet interior, and the sealing of the locking area between the counter cabinet door and the lockable cabinet door is displaced into the receiver of the counter cabinet door.

BRIEF DESCRIPTION OF THE DRAWINGS

This invention will be explained in greater detail in view of an embodiment represented in each of the drawings wherein.

DESCRIPTION OF PREFERRED EMBODIMENTS

Figure 1:
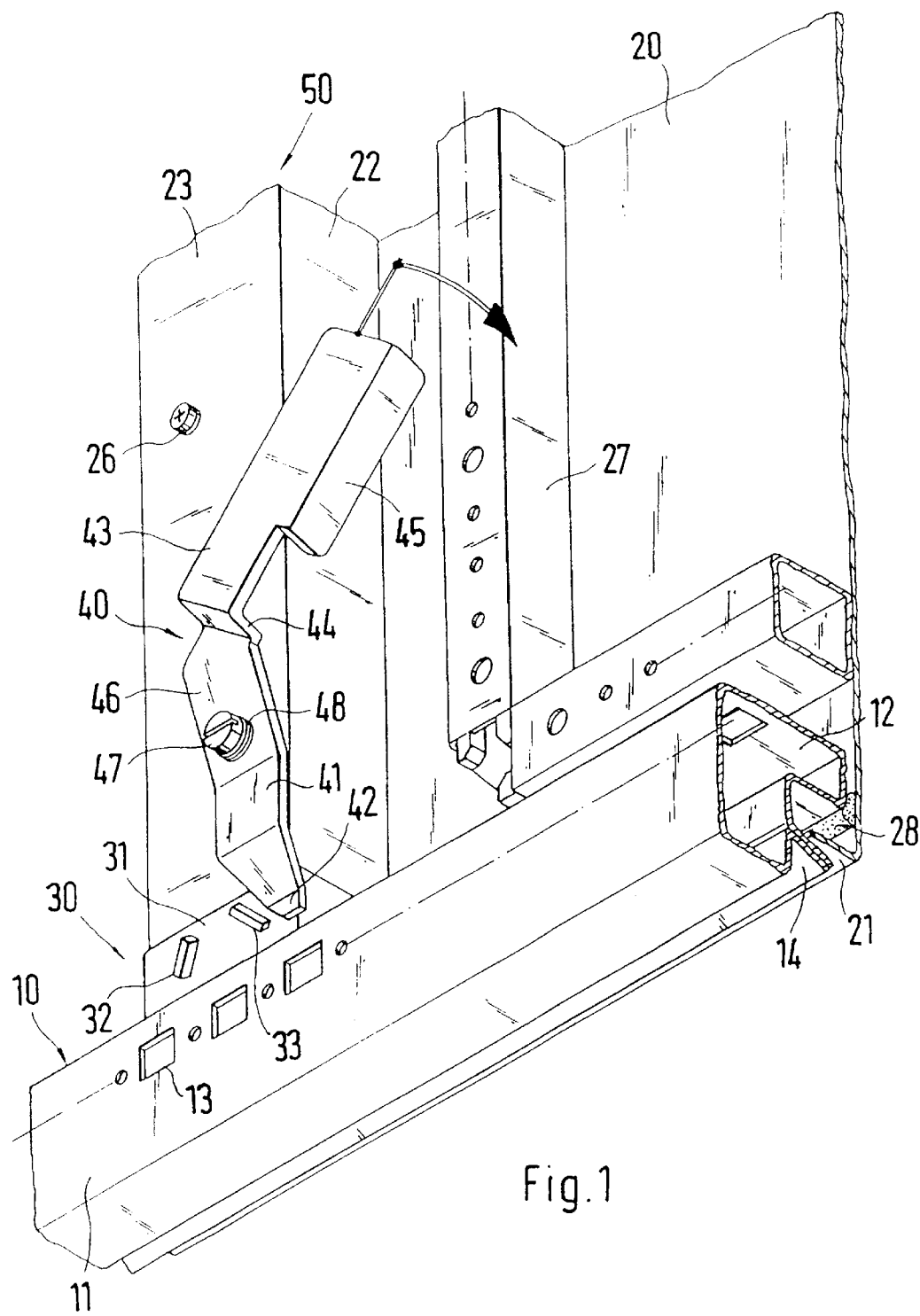
FIG. 1 is a partial view from a direction of the cabinet interior of the counter cabinet door locked at the bottom of the cabinet body.

In one embodiment, the cabinet body has a rack 10, whose frame legs border the open front of the switchgear cabinet. The lower horizontal frame leg 11 of the rack 10 is represented in the locking area of the counter cabinet door 20. The profiled sides, in particular the profiled side 12, have fastening system rows 13, known per se, which are alternatingly formed with bores and rectangular holes in even spacing. The frame leg 11 has a strip 14 toward the inside of the counter cabinet door 20 and a receiver for the beveled edge 21 of the counter cabinet door 20. On its inside the counter cabinet door 20 has a sealing element 28, by means of which a seal is made toward the frame leg 11. A frame made of mounting rails 27 is fastened on the inside of the counter cabinet door 20, and the same applies to the lockable cabinet door, not represented.

Figure 3:
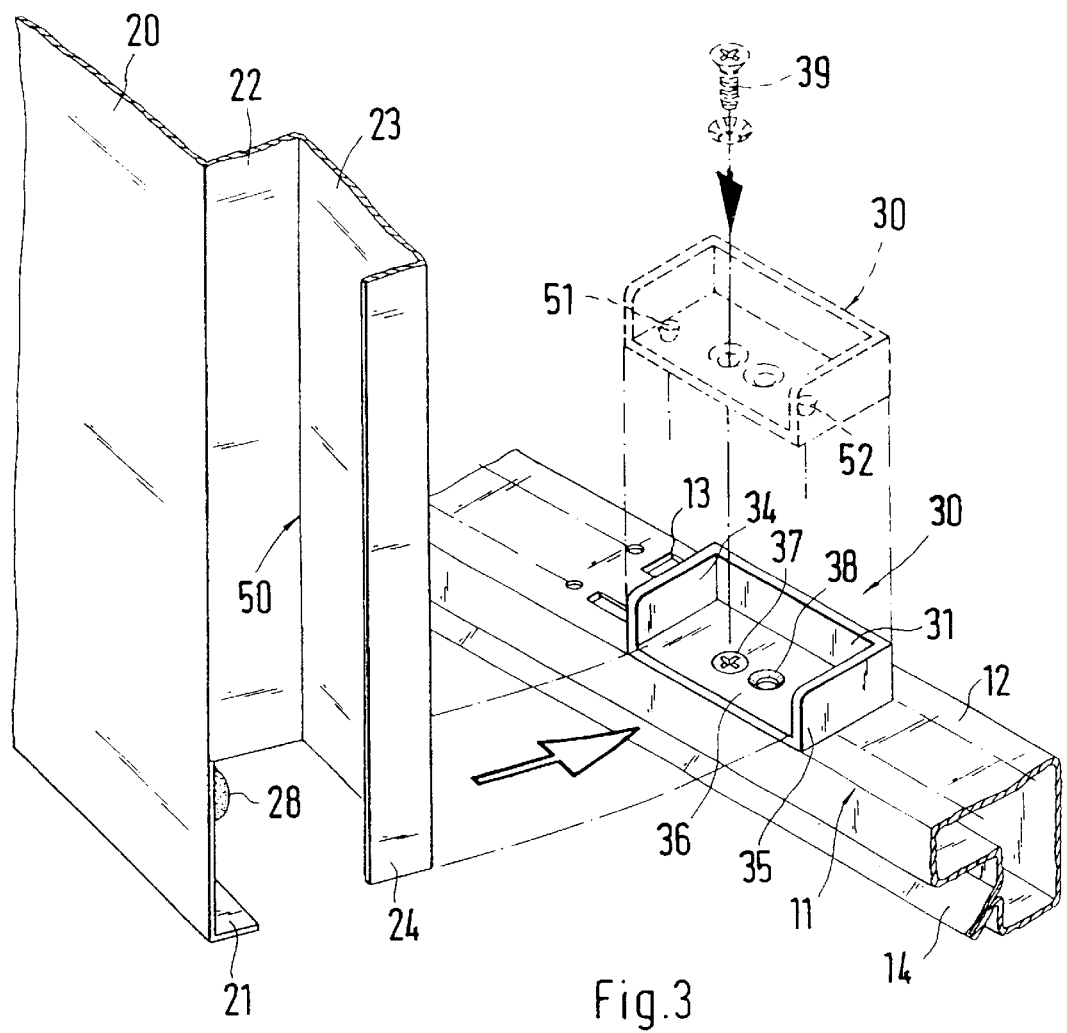
FIG. 3 is a partial view from the direction of the cabinet exterior with the lower buffer element for the beveled reception of the counter cabinet door.

A groove-shaped receiver 50, which is open to the outside, is formed in the locking area of the counter cabinet door 20 by being triple beveled with beveled sections 22, 23 and 24 as shown in FIG. 3. A locking lever 40 is rotatably seated on the beveled section 23, which extends parallel with the counter cabinet door and is displaced toward the cabinet interior. The seating comprises a seating screw 47 and a spring element 48, so that the locking lever 40 can perform compensating movements vertically in relation to the plane of the counter cabinet door 20 and can put the locking lever 40 under tension in this direction. The closing arm 41 and the actuating arm 43 are angled off the locking lever 40 in such a way, and the locking lever 40 is limited in its movements so that in the closing position, the actuating arm 43 does not cover the adjoining mounting rail 27, and in the opening position the actuating arm 43 does not project from the beveled section 24, as shown in FIG. 3, of the receiver 50 of the counter cabinet door 20.

As FIG. 3 shows, a buffer element 30 is fastened on the upper horizontal profiled side 12 of the frame leg 11, which forms a U-shaped buffer together with the legs 31, 34 and 35 and at the same time forms an opposite receiver for the receiver 50 of the counter cabinet door 20. When the receiver 50 is inserted into the buffer element 30, the leg 31 of the buffer element 30 projects by its wall thickness beyond the beveled section 23, as shown in FIG. 1. The locking section 41 of the locking lever 40 makes a transition into a locking projection 42 which is displaced with respect to the beveled section 23 so that it can extend behind the leg 31 of the buffer element 30 and is held by spring tension in this locking position. The locking movement is limited by the buffer 33 on the free outside of the leg 31.

The actuating arm 43 of the locking lever 40 is displaced by means of transition sections 44 and 46 with respect to the beveled section 23 so that it can be pivoted without obstruction into the opening position through the receiver 50. This displacement of the locking lever 40 is limited by a buffer 26 on the beveled section 23, for example by the buffer of a buffer flange 43, which is beveled in the end area of the actuating arm 43. By this design the actuating arm 43 can be easily grasped and operated. Its two end positions are clearly defined, so that mounting options on the mounting rail 27 are not hindered and that parts of the locking lever 40 cannot project at all beyond the beveled section 24 of the counter cabinet door 20.

As shown in FIG. 3, the beveled sections 22, 23 and 24 are shortened with respect to the door leaf with the beveled edge 21 so that they can be inserted into the U-shaped buffer element 30, while the edge 21 of the counter cabinet door 20 is inserted into the receiver of the frame leg 11 formed above the strip 14.

One side of the U-shaped buffer element 30 with the legs 31, 34 and 35 is closed by a fastening leg 36, so that it can be simply connected with the frame leg 11. On its outside, the fastening leg 36 has two positioning projections 51 and 52, by means of which it can be positioned on the frame leg 11 when using openings of the fastening system row 13. The fastening leg 36 has two spaced apart fastening bores 37 and 38, which can be aligned with a bore of the fastening system row 13. If the buffer elements 30 are identically designed, the fastening screw 39 enters the fastening bore 37 from the bottom and the fastening bore 38 from the top, as shown in FIGS. 3 and 4.

Figure 2:
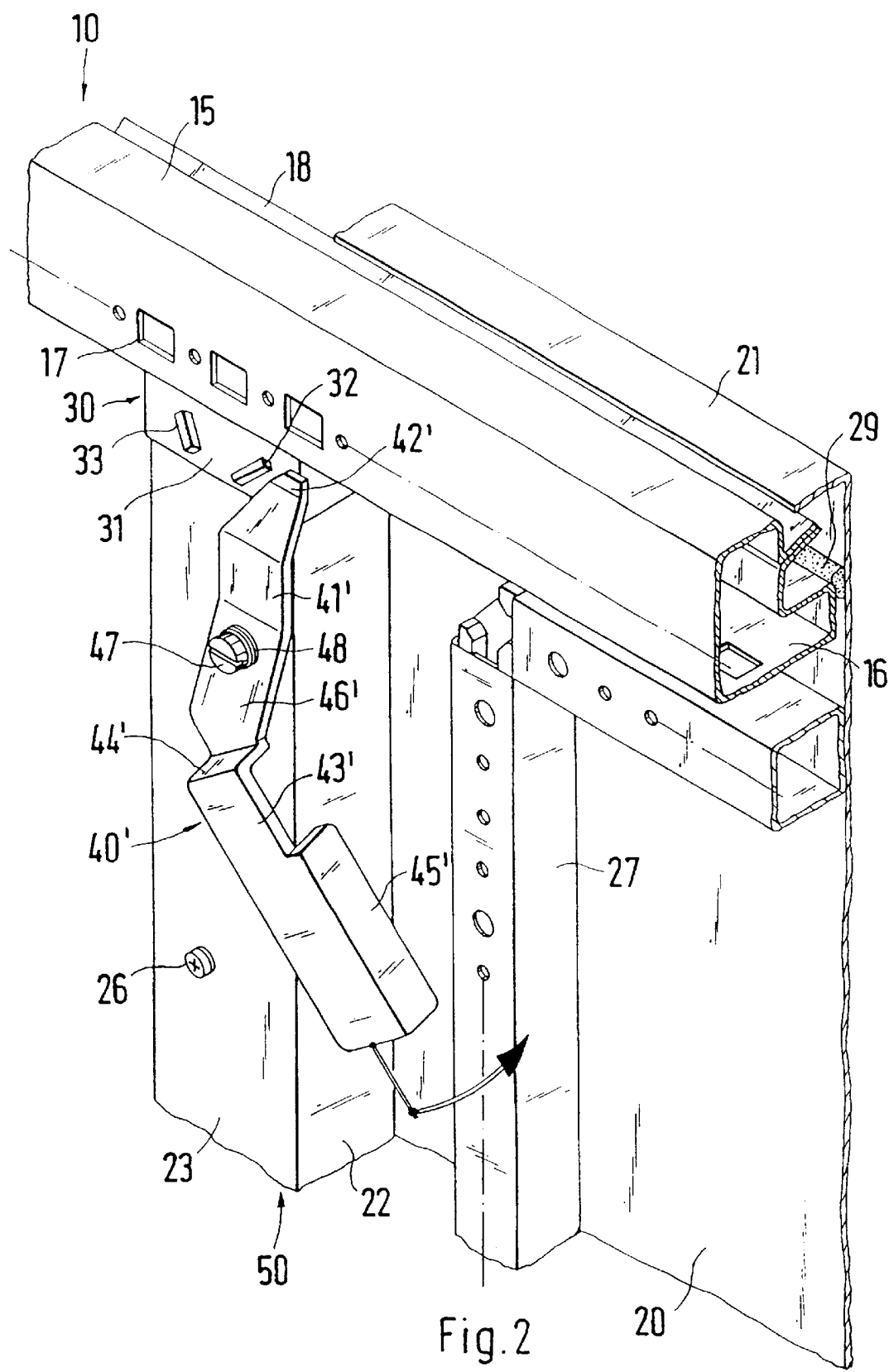
FIG. 2 is a partial view from the direction of the cabinet interior of the counter cabinet door locked at the top of the cabinet body.

As represented by FIG. 2, the upper locking lever 40' at the upper end of the counter cabinet door 20 is designed laterally reversed and beveled, wherein the parts of the locking lever 40 identified by 41', 42', 43', 44', 45'and 46' take on the same functions as the parts of the lower locking lever 40 identified by 41, 42, 43, 44, 45 and 46. A seating screw 47 and a spring element 48 also supply the rotatable seating and spring mounting of the locking lever 40'. The beveled section 23 supports a buffer 26 which limits the opening movement of the locking lever 40', and in the closing position the locking projection 42' contacts the buffer 33 of the buffer element 30.

Figure 4:
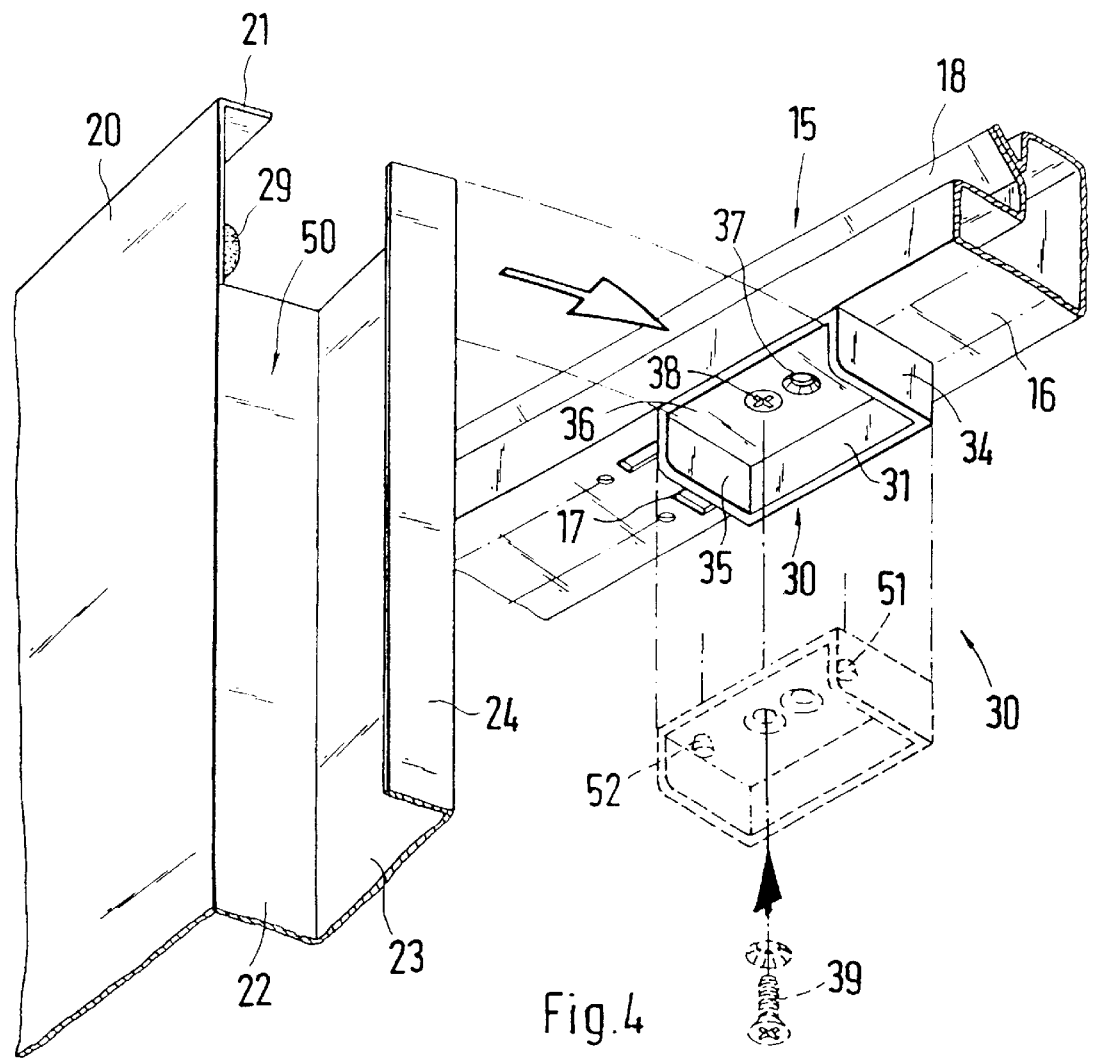
FIG. 4 is a partial view from the direction of the cabinet exterior with the upper buffer element for the beveled reception of the counter cabinet door.

As shown in FIG. 4, the beveled sections 22, 23 and 24 of the receiver 50 are also correspondingly shortened with respect to the door leaf with the edge 21 in order to be inserted into the buffer element 30, which is open toward the bottom. By using the fastening system row 17, the buffer element 30 is fastened on the profiled side 16 of the upper, horizontal frame leg 15 which faces the lower horizontal frame leg 11. The edge 21 can be inserted into the receiver arranged underneath the bar 18 of the frame leg 15, wherein the sealing element 29 takes over sealing between the counter cabinet door 20 and the frame leg 15.

The receiver 50 of the counter frame door 20 is covered by the lockable cabinet door, wherein the beveled edge is inserted into the receiver 50 and can be used for sealing the two cabinet doors in the locking area. Moreover, the rod closure arranged on the inside of the lockable cabinet door adjoining its edge, or another locking device, is received in the receiver of the counter cabinet door 20 and covered toward the cabinet interior.

What is claimed is:

1. In a switchgear cabinet having a cabinet body with an open front that can be closed sequentially by a counter cabinet door and a lockable cabinet door with a lock device, wherein the counter cabinet door is secured on the cabinet body at a top and at a bottom by two armed locking levers, the lockable cabinet door is secured on the cabinet body by a rod closure, and wherein the lockable cabinet door partially overlaps the counter cabinet door in a locking area, the improvement comprising:

the counter cabinet door (20) triple beveled in the locking area and forming a groove receiver (50) open toward an outside;

the locking levers (40, 40') laterally reversed and rotatably seated and spring-mounted on an inside of a beveled section (23) of the receiver (50) facing a cabinet interior and which are aligned parallel relative to a plane of the counter cabinet door (20);

a plurality of buffer elements (30) are attached, which are open toward the outside and project in a U-shape at the top and the bottom in the locking area, into which the beveled section (22, 23, 24) of the counter cabinet door (20) can be inserted;

in a closing position the locking levers (40, 40') extending with closing arms (41, 41') behind the buffer elements (30) and limited in a locking motion by first buffers (32, 33) of the buffer elements (30) so that actuating arms (43, 43') are prevented from entering into an area of mounting rails (27) attached to an inside of the counter cabinet door (20); and in an opening position the closing arms (41, 41') of the locking levers (40, 40') are rotated out of the buffer elements (30) area and the actuating arms (43, 43') are limited in an unlocking movement by second buffers (26) and project not from a beveled end section (24) of the receiver (50) extending vertically with respect to the counter cabinet door (20).

2. In the switchgear cabinet in accordance with claim 1, wherein the closing arms (41, 41') of the locking levers (40, 40') end in locking projections (42, 42') which are displaced toward the cabinet interior by an amount of a wall thickness of the U-shaped buffer elements (30) with respect to the inside of the beveled section (23) of the receiver (50) extending parallel with the counter cabinet door (20).

3. In the switchgear cabinet in accordance with claim 2, wherein the buffer elements (30) are identically embodied and have two of the buffers (32, 33) on the outside facing the cabinet interior, and the buffers (33 to 32) respectively facing the mounting rail (27) work together with the locking lever (40 or 40').

4. In the switchgear cabinet in accordance with claim 3, wherein an open front of the cabinet body is bordered by frame legs (11, 15) of a rack (10), and the U-shaped buffer elements (30) have fastening legs (36) for fastening on facing profiled sides (12, 16) of the horizontally extending frame legs (11, 15).

5. In the switchgear cabinet in accordance with claim 4, wherein fastening system rows (13, 17) with uniformly spaced bores and rectangular holes are cut into the profiled sides (12, 16) of the frame legs (11, 15), and the fastening legs (36) have positioning projections (51, 52) insertable into the openings of the fastening system rows (13, 17) and have fastening bores (37, 38) aligned with bores of the fastening systems rows (13, 17).

6. In the switchgear cabinet in accordance with claim 5, wherein the actuating arms (43, 43') are displaced via transition sections (44 and 46, or 44' and 46') toward the cabinet interior in relation to an inside of the beveled section of the receiver (50) extending parallel with the counter cabinet door (20).

7. In the switchgear cabinet in accordance with claim 6, wherein the actuating arms (43, 43') have beveled buffer flanges (45, 45') near displaced ends.

8. In the switchgear cabinet in accordance with claim 7, wherein a beveled edge of the lockable cabinet door is insertable into the receiver (50) of the counter cabinet door (20), and the rod closure attached to the inside of the lockable cabinet door is received in the receiver (50) of the counter cabinet door (20).

9. In the switchgear cabinet in accordance with claim 1, wherein the buffer elements (30) are identically embodied and have two of the buffers (32, 33) on the outside facing the cabinet interior, and the buffers (33 to 32) respectively facing the mounting rail (27) work together with the locking lever (40 or 40').

10. In the switchgear cabinet in accordance with claim 1, wherein an open front of the cabinet body is bordered by frame legs (11, 15) of a rack (10), and the U-shaped buffer elements (30) have fastening legs (36) for fastening on facing profiled sides (12, 16) of the horizontally extending frame legs (11, 15).

11. In the switchgear cabinet in accordance with claim 10, wherein fastening system rows (13, 17) with uniformly spaced bores and rectangular holes are cut into the profiled sides (12, 16) of the frame legs (11, 15), and the fastening legs (36) have positioning projections (51, 52) insertable into the openings of the fastening system rows (13, 17) and have fastening bores (37, 38) aligned with bores of the fastening systems rows (13, 17).

12. In the switchgear cabinet in accordance with claim 1, wherein the actuating arms (43, 43') are displaced via transition sections (44 and 46, or 44' and 46') toward the cabinet interior in relation to an inside of the beveled section of the receiver (50) extending parallel with the counter cabinet door (20).

13. In the switchgear cabinet in accordance with claim 12, wherein the actuating arms (43, 43') have beveled buffer flanges (45, 45') near displaced ends.

14. In the switchgear cabinet in accordance with claim 1, wherein a beveled edge of the lockable cabinet door is insertable into the receiver (50) of the counter cabinet door (20), and the rod closure attached to the inside of the lockable cabinet door is received in the receiver (50) of the counter cabinet door (20).

* * * * *